United States Patent [19]

Grider

[11] 4,186,631
[45] Feb. 5, 1980

[54] THREADING APPARATUS FOR A STANDARD ENGINE LATHE

[76] Inventor: James D. Grider, 3902 Galway, Houston, Tex. 77080

[21] Appl. No.: 881,021

[22] Filed: Feb. 24, 1978

[51] Int. Cl.² .............................................. B23B 1/00
[52] U.S. Cl. ........................................................ 82/5
[58] Field of Search ...................................... 82/5, 5.5

[56] References Cited

U.S. PATENT DOCUMENTS

| | | | |
|---|---|---|---|
| 2,379,370 | 6/1945 | Metz | 82/5 X |
| 2,396,631 | 3/1946 | Andresen | 82/5 |
| 2,533,254 | 12/1950 | Wigham | 82/5 |
| 3,897,704 | 8/1975 | Schuell | 82/5 |

FOREIGN PATENT DOCUMENTS

| | | | |
|---|---|---|---|
| 1019692 | 11/1952 | France | 82/5 |
| 1087027 | 8/1954 | France | 82/5 |
| 1194148 | 5/1959 | France | 82/5 |
| 333277 | 11/1958 | Switzerland | 82/5 |

Primary Examiner—Harrison L. Hinson
Attorney, Agent, or Firm—Donald Gunn

[57] ABSTRACT

An apparatus for threading a work piece on a standard engine lathe is disclosed. In the preferred embodiment, the apparatus utilizes an accessory supporting the cutting point on the cross feed of the carriage with a proximity linkage. The proximity linkage determines when the lead screw has carried the carriage to the limits desired for its travel. It releases by use of a movable cam a spring retract mechanism which withdraws the accessory and, hence, the tool point, from a cutting position adjacent to the work piece. Alternate embodiments are disclosed including a positioned set of cams on linkage rods and an alternate form of hand operated, hand reset, retractable apparatus.

10 Claims, 12 Drawing Figures

THREADING APPARATUS FOR A STANDARD ENGINE LATHE

BACKGROUND OF THE DISCLOSURE

The present disclosure is directed to an accessory for use with a standard engine lathe (defined as a single point tool). Quite often, a thread must be cut on a work piece with a single point tool. While thread cutting dies are available, they very often are not profitable for a multitude of reasons. An easy example is where a thread must be cut in ten pieces. It may be a thread where the thread pitch, work piece diameter, thread length and other factors combine to prevent use of certain standard thread cutting dies. Moreover, the number of pieces may be so small as to preclude the cost of programming a numerical control machine. Numerical control machines are intended for high production runs and are otherwise limited in their circumstances. Where they are appropriate, they do a very acceptable job; however, they are limited in application and cannot be used in all circumstances for low volume production runs and the like.

A standard engine lathe is found in practically every machine shop. Numerical control machines and thread cutting dies are not necessarily available in every small machine shop because of cost and, further, in light of their limited application. The present invention is an attachment for a standard engine lathe which converts it into a much more profitable thread cutting machine. The present invention is thus intended for use with an engine lathe of typical construction having ways on which a carriage travels between head stock and tail stock. The carriage normally travels the length of the machine on a lead screw with a traveling nut which engages the lead screw to traverse the machine. Several difficulties in cutting a thread on an engine lathe exist. Some of these will be recounted.

One difficulty in utilizing an engine lathe to cut a thread is that several passes must be made. The first pass is typically fairly deep and removes substantial quantities of metal. However, it normally does not remove enough metal to cut the thread, and, equally important, it may leave a rough surface. Additional passes are required to complete the thread to the required depth and to smooth the faces of the thread to an optimum surface. Two or three problems arise at the termination of the thread. Since the thread is cut with the carriage traversing the ways at the urging of the lead screw, cutting must be ended with rather precisely timed disengagement of the traveling carriage from the lead screw. When this is done, it leaves the tool point at a fixed location with the work piece still rotating and will cut a ring at the end of the thread. In other words, the last few revolutions of the work piece will carve a ring, not a helical thread. Sometimes, it is acceptable to ring a set of threads, but sometimes it is not so desirable. Alternately, thread relief can be cut at the end of the set of threads. This may be limited, however, by abutting shoulders or other factors relating to the geometry of the work piece. Sometimes, the work piece will simply not permit any room because the thread ends immediately adjacent to a protruding shoulder or other portion, thereby limiting maneuverability of the tool point.

Some people attempt to avoid some of these problems by operating the machine at a lower rate of speed. This, however, is not so easily accomplished. If nothing else, it is accomplished at great cost because it extends the machining time for the work piece. In other instances, it is not easily accomplished because the reduction in speed of the work piece and the proportionate reduction of speed in lead screw advance is accomplished at the price of reducing the velocity of the cutting point. Some materials must be cut within specified velocities. While excessive cutting speed may be an obvious drawback, it is not quite so obvious to state that a difficient cutting speed is also undesirable in some instances. If the cutting speed is reduced below the desired range for certain materials, the cutting tool may not cut as smoothly as desired.

Where multiple passes must be made to complete the thread, the several multiple passes are difficult to coordinate so that the operator manually backs off the cross feed mechanism. The present invention overcomes these problems and many others by providing an apparatus which is able to make multiple passes with a single tool point and thereby cut a thread with multiple passes. The cutting point is backed out of the thread at the required location, thereby terminating the thread very nicely, avoiding ringing of the thread, thread runout and otherwise removing it from the work piece to stay clear of the work piece.

BRIEF DESCRIPTION OF THE DISCLOSED EMBODIMENT

The present apparatus is an accessory or attachment for use on an engine lathe. It mounts on the traveling carriage and is carried by the cross feed mechanism. It supports a single tool point for cutting a work piece. The apparatus incorporates a linkage which determines the position of the carriage relative to the work piece. When a specific position is achieved, a linkage conveys this information via movement of the linkage to a cam. The cam has the preferred form of a high lobe which is pushed aside, and a locking mechanism is released, and it, in turn, releases a compressed coil spring which retracts the accessory from a cutting position. The accessory is mounted on a dovetail slide mechanism so that it can pull away from the work piece on release of the spring.

DETAILED DESCRIPTION OF THE ILLUSTRATED EMBODIMENTS

Figure 1:
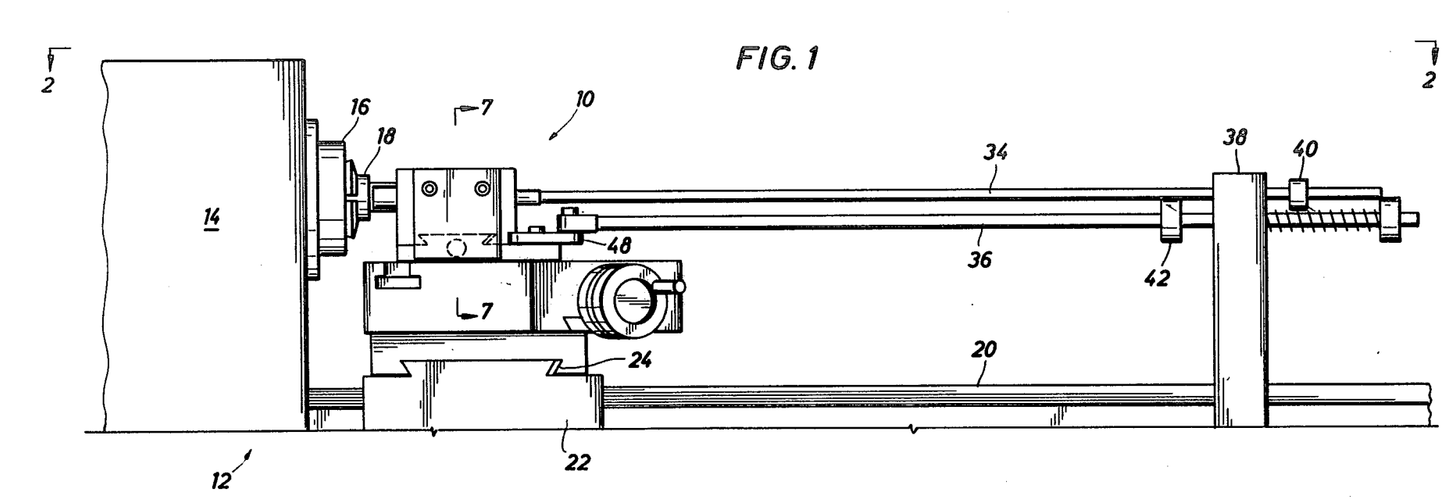
FIG. 1 discloses the accessory of the present invention attached to an engine lathe showing the lathe in side view where the attachment of the present invention is mounted on a dovetail perpendicular to the axis of the work piece.

In the drawings, attention is first directed to FIG. 1 of the drawings where the accessory of the present invention is generally identified by the numeral 10. It is attached to a lathe generally identified by the numeral 12. The lathe 12 includes a head stock 14 and a collet 16 which supports a work piece 18. The work piece is any piece of material on which a thread is cut. It is grasped in the chuck or collet and rotated at a specified rate by setting controls of the lathe 12. In addition, the lathe includes a set of parallel ways 20 which extend the length of the machine and support a traveling carriage 22. The traveling carriage 22 transverses the ways on a lead screw below the ways. The lead screw is rotated by a gear box at a speed proportionate to the speed of rotation of the head stock. The lead screw is selectively engaged by a traveling nut in the traveling carriage so that the carriage moves from the far right towards the left in customary operation of the lathe.

The carriage is equipped with vernier controlled adjustments whereby the tool point is moved in or out. In most engine lathes, the carriage may support two adjustable positioning devices which maneuver the tool point toward the work piece. For instance, one may be precisely perpendicular to the axis of the rotation of the work piece, and a second is at an angle of perhaps thirty or forty-five degrees from the first. It is sufficient for description of the present apparatus that the traveling carriage include a perpendicular cross feed so that the tool point can be positioned at the required depth of penetration against the work piece. To this end, the numeral 24 identifies a dovetail slide mechanism whereby the carriage supports a tool point for movement into or away from the work piece. Customarily, the dovetail arrangement permits the top portions of the traveling carriage to move perpendicular to the axis of the work piece 18.

The present invention is supported on the top of the carriage and, in turn, supports a single tool point. The tool point is identified by the numeral 28 in FIG. 2. The present apparatus is supported on a dovetail slide mechanism shown in dotted line in FIG. 1 which will be described in greater detail hereinafter. This enables the tool point to move to cutting position as shown in FIG. 2, and it also permits it to be retracted away from the work piece.

Figure 2:
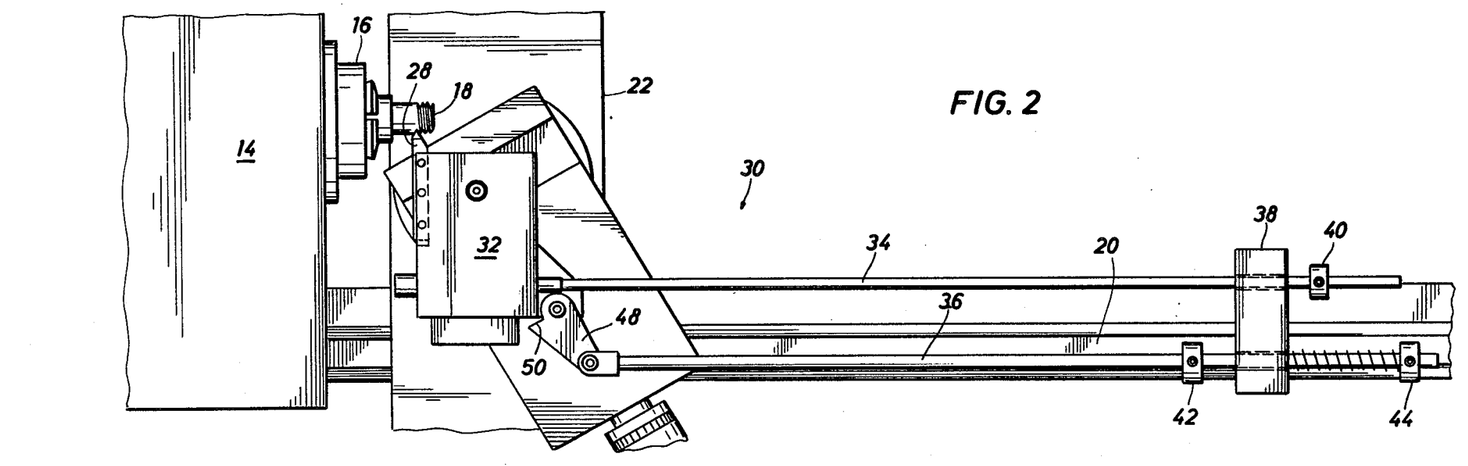
FIG. 2 is a top view of the apparatus shown in FIG. 1, and it particularly discloses a linkage mechanism which sets and resets the present apparatus.

The apparatus of the present invention is shown in plan view in FIG. 2. In this embodiment, certain linkages are included. The embodiment shown in FIG. 2 is identified generally by the numeral 30. It incorporates a slide-mounted housing or body 32. It has a first linkage 34 and a second linkage 36. The two pass through a fixed post 38 supported near the tail stock on the lathe. The post 38 is a trip device for movement of the linkages 34 and 36.

The linkage 34 supports a movable collar 40. In addition, movable collars 42 and 44 are supported on the other linkage. The movable collars 40, 42 and 44 are attached by set screws. They are released, moved to a specified location and locked. The basis for positioning relates to the size of the work piece, the length of the thread to be cut and other scale factors. The operation of the collars will be explained later.

The linkage 36 is pivotly connected to an eccentric rotated, locking cam 48. As shown in FIG. 2, the cam 48 is pivotly mounted. It is pivotly mounted so that it positions a shoulder 50 against the housing 32 to jam the housing 32 towards the work piece. As viewed in FIG. 2 of the drawings, clockwise rotation achieves this. By contrast, counterclockwise rotation permits the housing 32 to be retracted. More will be noted concerning this hereinafter.

Figure 4:
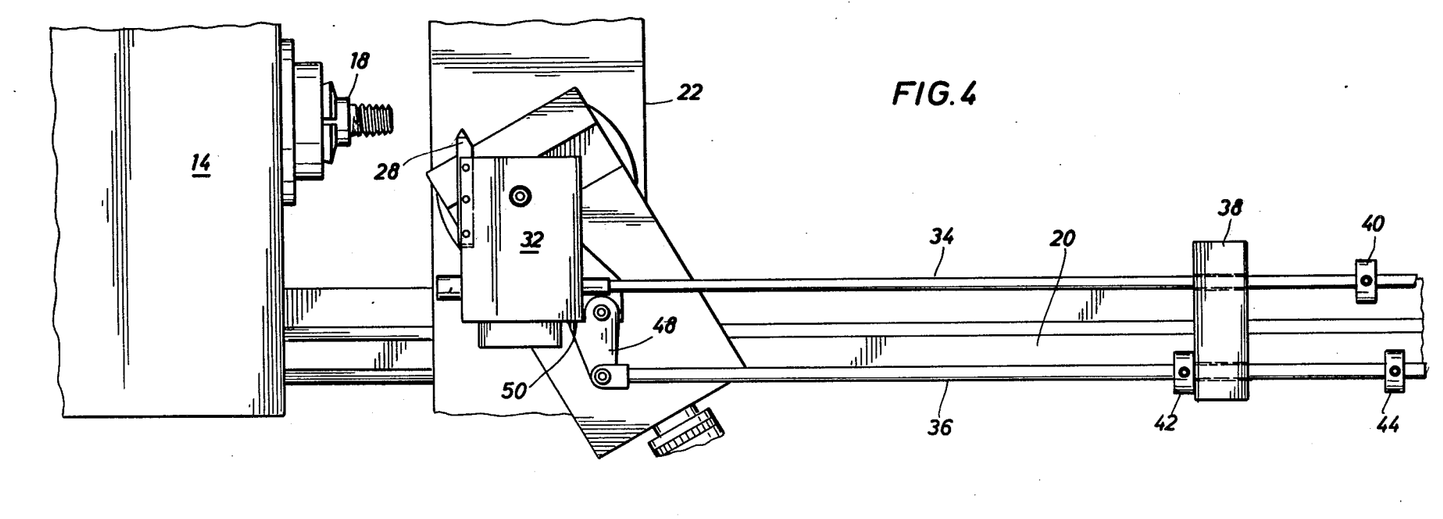
FIG. 4 is a view similar to FIG. 3 showing the position of the linkage after the traveling carriage has been moved to initiate a subsequent pass of the tool point.

Attention is next directed to FIG. 4 of the drawings. There, presume for sake of the description that six passes are required to cut the thread in the work piece 18. Further, presume that two passes have been made. Assume further that the traveling carriage has been moved away from the work piece, or to the right in FIG. 4, by the operator. The latter move is achieved by the operator, who disengages the carriage from the lead screw and then, by hand rotation, moves the carriage towards the tail stock of the lathe. As this happens, the levers are urged to the right relative to the post 38. The linkage 36 passes through the post. When the collar 42 fastened to it jams against the post, the linkage 36 is jammed to the left of FIG. 4 and thereby rotates the eccentric mounted cam 48. When the cam 48 rotates, it drives the housing 32 toward the work piece, cocking the apparatus and holding it in this position. Thereafter, as the carriage pulls the collar 42 away from the post, the position achieved in FIG. 4 is maintained. It is maintained until the collar 44 is carried against the post 38. This then rotates the collar 48 counterclockwise, retracting it from the locking position by removing the shoulder 50 which, in turn, frees the apparatus for retraction.

Retraction is controlled by positioning the collar 40. The collar 40 is moved in position relative to the post at the time of setup. During setup, it is located so that travel of the carriage 22 towards the head stock brings the collar 40 against the post 38. When contact actually occurs, the linkage 34 is pulled to the right, triggering a release movement whereby the tool point 28 is withdrawn or retracted.

Figure 3:
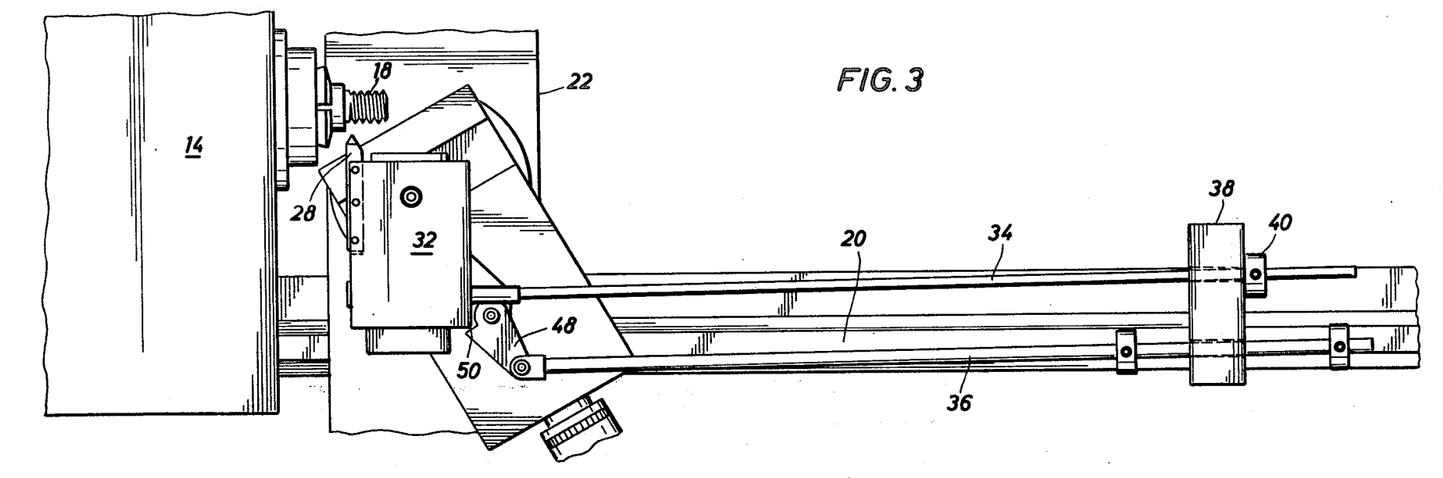
FIG. 3 is a view similar to FIG. 1 showing the tool point retracted from a cutting position by operation of the linkage.

Attention is directed to FIG. 3 of the drawings, which shows some of this. FIG. 3 shows the carriage at the end of travel permitted for cutting the thread on the work piece 18. Such movement is achieved by bringing the collar 40 against the post 38, which pulls the linkage 34 to the right, thereby triggering movement of the tool point away from the work piece. This is shown in that the tool point is retracted from the threads in the work piece. Moreover, the eccentric cam 48 has been rotated counterclockwise to permit such retraction.

From the foregoing, the sequence of operations can be understood. When a first thread is cut, the cross feed mechanism of the carriage 22 is operated to adjust the relative depth of cut of the tool point 28 in the work piece 18. The collars 40, 42 and 44 are located as desired. The carriage is moved to the right to a position exemplified in FIG. 4. At this point, the collar 42 jams against the post 38 which, in turn, rotates the locking cam 48 and thereby setting the housing 32 so that the tool point will cut in the work piece. A first pass occurs where the tool point 28 cuts threads to a specified depth. Cutting of the work piece continues until retraction. Retraction occurs when the collar 40 contacts the post 38, transfers a pulling movement through the linkage 34, and retraction occurs. Second and other subsequent passes of the tool point against the work piece are repeated in the same manner. As they are repeated, they cut the thread to a satisfactory depth with satisfactory smoothness. In each instance, the several passes are initiated in the same fashion and are terminated at the same location.

To this juncture, the mechanism by which retraction is achieved has not been explained. It will be explained by referring to other views in the drawings.

Figure 5:
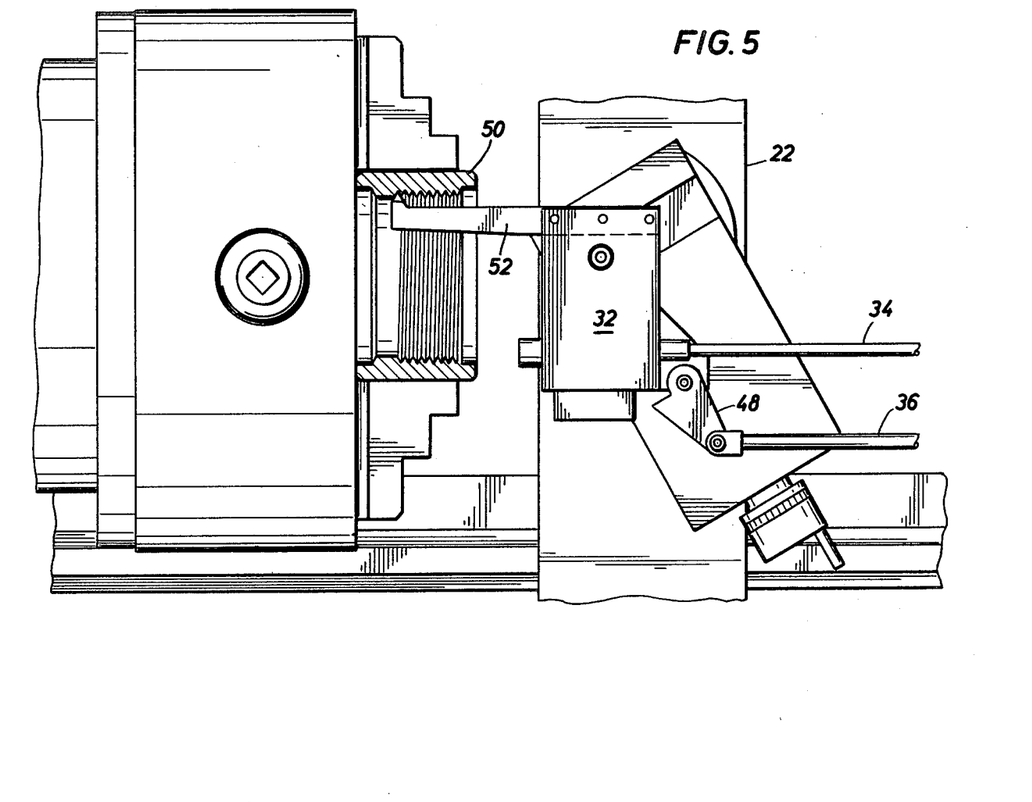
FIG. 5 shows the present invention cutting an inside thread in contrast with the external thread depicted in FIGS. 1 through 4.

The present invention is able to cut an inside thread as particularly shown in FIG. 5 of the drawings, where a hollow coupling 50 is held in the chuck. The coupling 50 has an inside thread which is cut by a well known but differently shaped tool point 52. The tool point 52 is apparatus well known in the trade. It is mounted at a different angle, but it functions in the same manner. More importantly, multiple passes on the thread can be achieved in the same manner utilizing the present invention.

Figure 6:
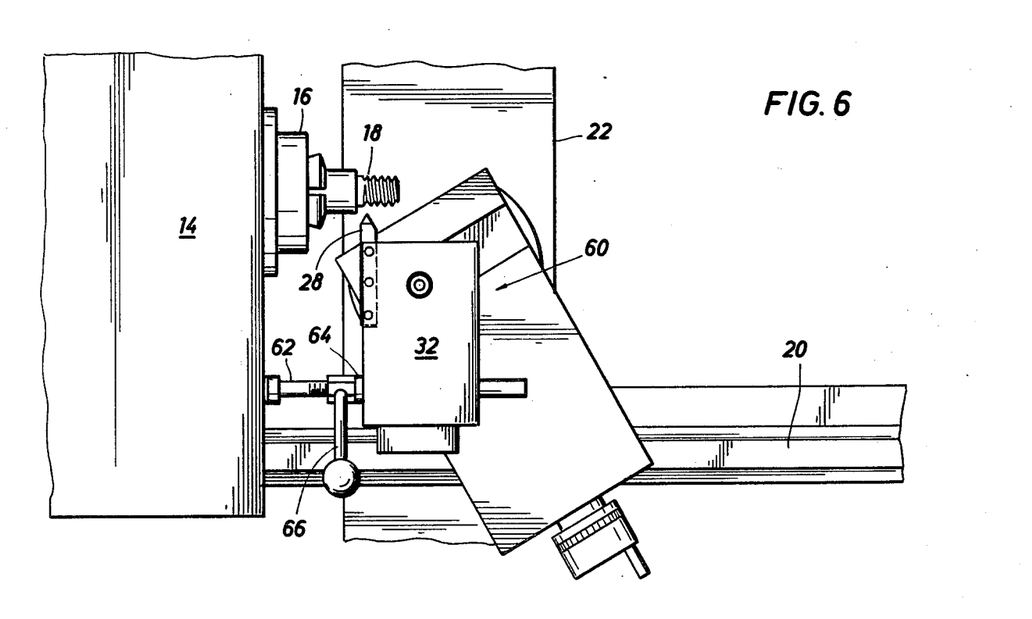
FIG. 6 is an alternate embodiment of the present invention wherein this embodiment is hand manipulated to be set and triggers on proximity to the head stock.

In FIG. 6 of the drawings, an alternate embodiment is disclosed. FIG. 6 discloses a modified version which is identified generally by the numeral 60. The apparatus 60 differs in that it does not require the linkage shown in FIGS. 1 through 4. The linkage has been omitted. In its place, a hand operated mechanism is included. It will be observed in FIG. 6 that it mounts in like fashion to the embodiment 10 shown in FIG. 1.

Figure 7:
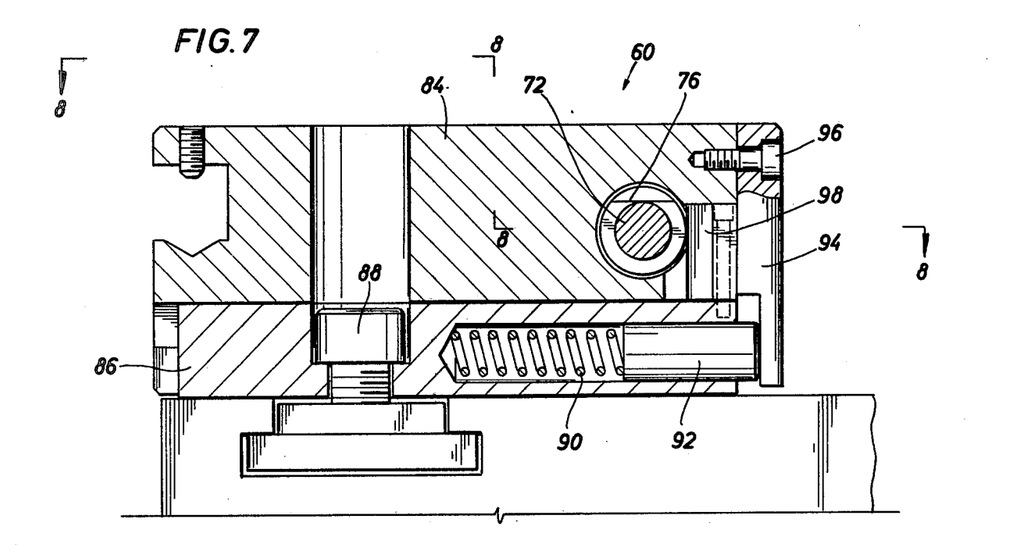
FIG. 7 is a sectional view along the line 7—7 of FIG. 1 showing internal details of construction of the accessory which is mounted on a dovetail slide mechanism.
Figure 8:
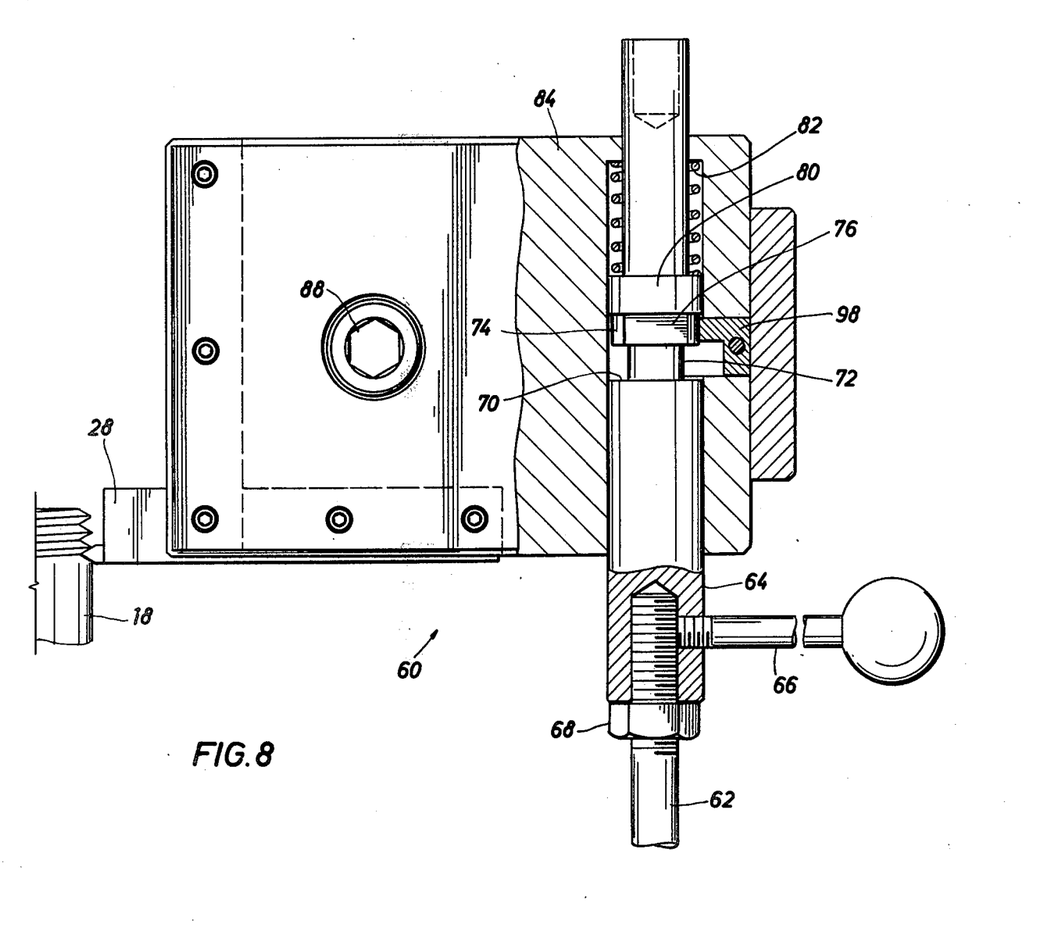
FIG. 8 is a sectional view along the line 8—8 of FIG. 7 showing additional details of construction of the apparatus.

Attention is next directed to FIGS. 7 through 10, to be considered jointly. Here, the internal workings of the embodiment 60 are shown. The embodiment 10 functions in a similar fashion on the interior of the apparatus, the sole differences arising from substitution of the linkage shown in FIG. 1 for the hand operated mechanism shown in FIG. 8. In FIG. 8 of the drawings, the numeral 62 identifies a probe. The probe is adjusted in position by selectively threading it into a tapped, countersunk hole in a slide bar 64. A hand lever 66 is likewise threaded in a lateral drilled hole. The probe 62 is adjusted in position, and a lock nut 68 secures it at a specified location. The length of the probe 62 is adjusted so that it can be controllably set to contact the cowling on the head stock. This contact is a physical signal which ends cutting of the thread as will be described.

The slide bar 64 is a substantially solid, round bar which has a shoulder cut in it at 70. This reduces the size to a narrow neck. The neck is identified by the numeral 72. A ring is formed about it at 74, and the ring has a flat cut in it at 76. The flat 76 is better shown in FIG. 7 of the drawings. The flat is a face which cooperates with additional equipment to be described. An enlarged ring 80 is adjacent to the smaller ring 74. It provides a shoulder to receive a spring 82 which is a multiple turn coil spring. The spring 82 is received in a cavity within the housing 84. The housing 84 is primarily a large plate or block which defines the body of the tool and gives it shape. The body 84 is shown in FIG. 8 of the drawings to incorporate a set of V-shaped grooves for supporting a tool point. In addition, the body 84 is drilled at a cental location to expose a bolt as shown in FIG. 7 for assembly and disassembly purposes.

The body 84 is supported on a plate 86. The plate 86 has a top face which contacts the bottom face of the body 84 as shown in FIG. 7. More importantly, the two join together in a dovetail as shown in dotted line in FIG. 1. This is achieved by cutting angled sides between the top plate 84 and the bottom plate 86. This guides movement of the top plate. As viewed in FIGS. 7 and 8, the top plate can move from right to left and is constrained in its movement by the dovetail connection with the bottom plate 86. The bottom plate 86, in turn, is drilled to receive the bolt 88 which secures it to the traveling carriage. This is the means of attachment of the present invention to the traveling carriage. On release, the bolt 88 is unthreaded to thereby remove the equipment. Otherwise, the threaded joint is made tight to secure the apparatus to the traveling carriage.

FIG. 7 of the drawings discloses how the top plate 84, a structure of substantial thickness, is drilled to receive the slide bolt 64. The slide bolt 64 is slidably mounted.

In FIG. 7, the numeral 90 identifies a compressed coil spring captured in a drilled hole formed in the bottom mounting plate 86. The spring 90 bears against a slidable plug 92. The plug fits loosely in the drilled hole. It is incorporated for the purpose of conveying the axial push achieved by the spring against the upper plate 84 in the manner to be described.

Figure 9:
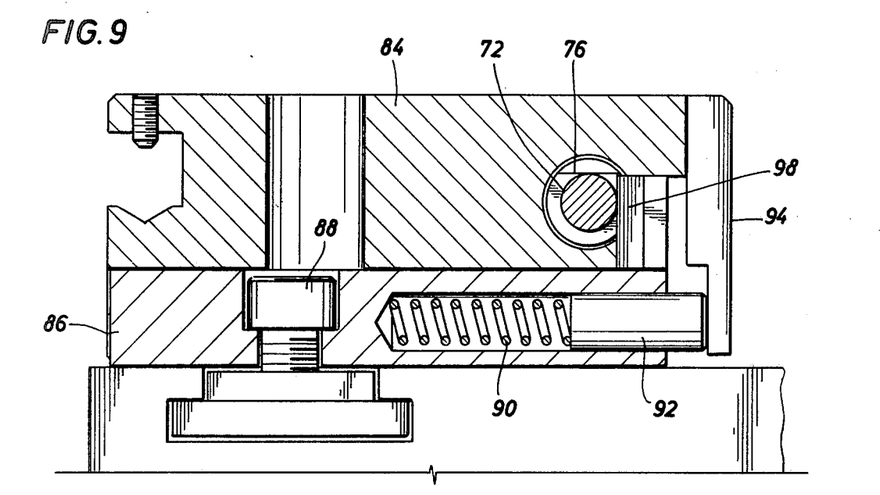
FIG. 9 is a view similar to FIG. 7 showing the range of retraction of the apparatus at the urging of a spring shown in the drawing.

The spring 90 is compressed in FIG. 7 and is shown in an extended or relaxed condition in FIG. 9. There, it will be observed that the plug 92 is forced against an end plate 94. The plate 94 is, in turn, bolted by suitable machine bolts 96 to the top plate 84. The end plate 94 conveys a retracting force to the top plate 84. The top plate slides to the right which can be observed on viewing FIGS. 7 and 9. The length of travel is not very large; it is only necessary that travel be accomplished through a distance sufficient to retract the tool point from the work piece. To this end, the bottom plate 86 supports a vertically positioned, L-shaped cam follower 98. The cam follower 98 is bolted to the bottom plate 86. It stands upright from the bottom plate through a generally rectangular passage formed vertically in the top plate 84. The passage passes immediately adjacent to the circular, horizontal hole drilled through the top plate 84. At the point of intersection, the cam follower 98 is positioned immediately adjacent to the slide bolt 64. It is located so that it can find the narrow neck 72. Dimensions of the apparatus are such that the narrow neck 72 permits movement by a distance equal to the reduction in size between the narrow neck 72 and the ring 74 immediately adjacent to it. As viewed in FIGS. 8 and 10 of the drawings, the slide bolt 64 can be pushed to compress the spring 82. There is a limit of travel, but travel is permitted to the extent that the narrow neck 72 is positioned adjacent to the cam follower 98.

Figure 10:
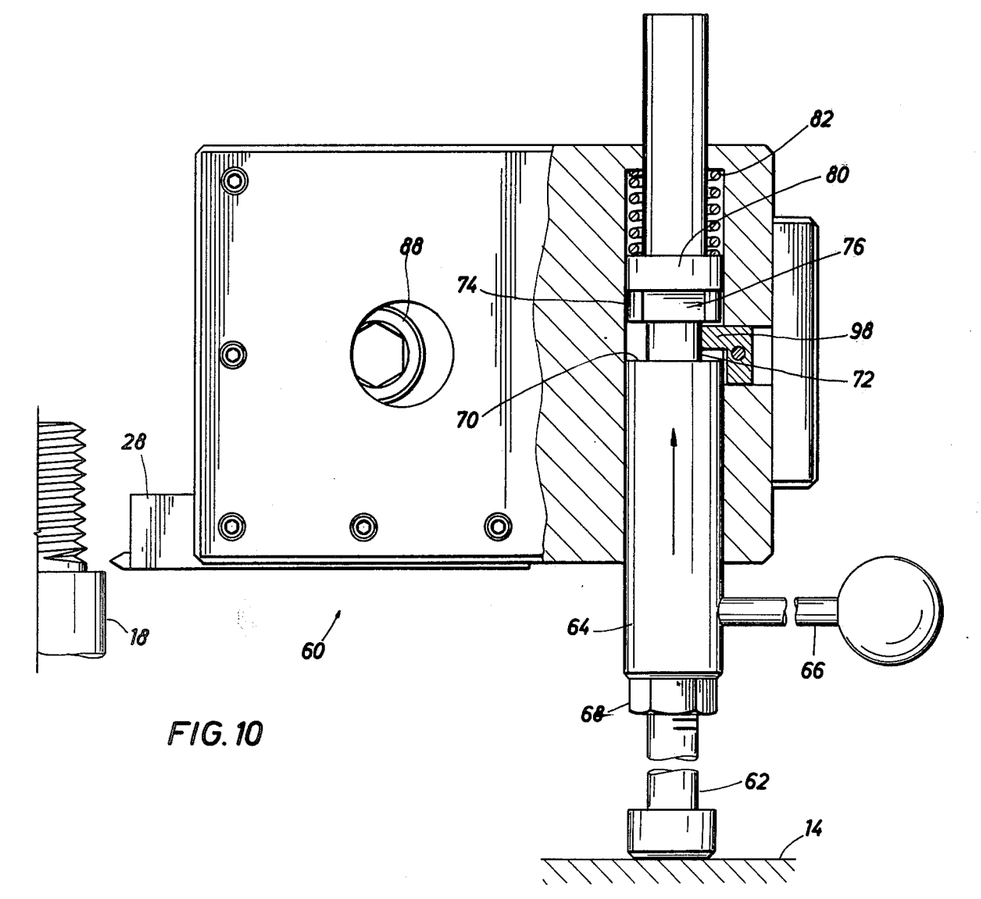
FIG. 10 is a view contrasted with FIG. 8 of the drawings showing how the tool point is retracted on contact of the hand set linkage against the head stock.

Contrast of these two drawings will show how this occurs. The probe 62 extends towards the head stock. As the traveling carriage moves towards the head stock, the probe 62 is contacted against it. When such contact occurs, it provides relative movement to the bolt 64. Relative movement is shown by the direction of the arrow in FIG. 10. As this occurs, it works against the compressed coil spring 82. The spring force is overcome while the traveling carriage continues to move towards the head stock. This relatively moves the cam follower 98 to a position adjacent to the neck 72. When this is achieved as shown in FIG. 10, this unlocks the top plate 84 for sliding movement at the urging of the spring 90. The spring 90 forces against the plug 92 which, in turn, forces the end plate 92 and the attached apparatus to the right as shown in FIG. 9. Such sliding movement is accompanied by retraction of the tool point from the work piece. More importantly, it occurs at a specified distance of the traveling carriage from the head stock which, in turn, means that the tool point is always retracted at the same location relative to the work piece 18. This high degree of predictability means that the tool point can make multiple passes on the work piece, and it will be withdrawn at the same location, namely, the desired end of the thread cut in the work piece.

Resetting is relatively easy to achieve. The hand gripped lever 66 is used to rotate the sliding bolt 64. This positions the flat 76 parallel to the contacting face of the cam follower 98. As shown in FIG. 7, the flat 76 is tangent to the narrow neck 72. When the flat is presented against the cam face 98, sliding movement decompresses the spring 82 and repositions the larger ring 74 against the cam follower 98. The lever 66 is then rotated to restore the flat face to the up position as shown in FIG. 7. This is accompanied by positive movement whereby the upper plate moves to the left in FIG. 9 back to the original position shown in FIG. 7. This also recompresses the spring 90.

In the embodiment 10 shown in the drawings, it is permissible to omit the probe 62 and the handheld lever 66 and substitute the linkages 34 and 36. The linkage 34 determines the position of the traveling carriage in the same manner as the probe 62. They differ in that the probe 62 determines position relative to the head stock, while the linkage 34 determines the position of the traveling carriage relative to a fixed reference point, the post 38 attached near the righthand end of the lathe.

From the foregoing description, it will be seen how the embodiments 10 and 60 are similar. The embodiment 10 utilizes the linkage shown in FIGS. 1 through 4, while the embodiment 60 is hand operated to be reset and utilizes the probe 62 to locate a fixed reference.

Figure 11:
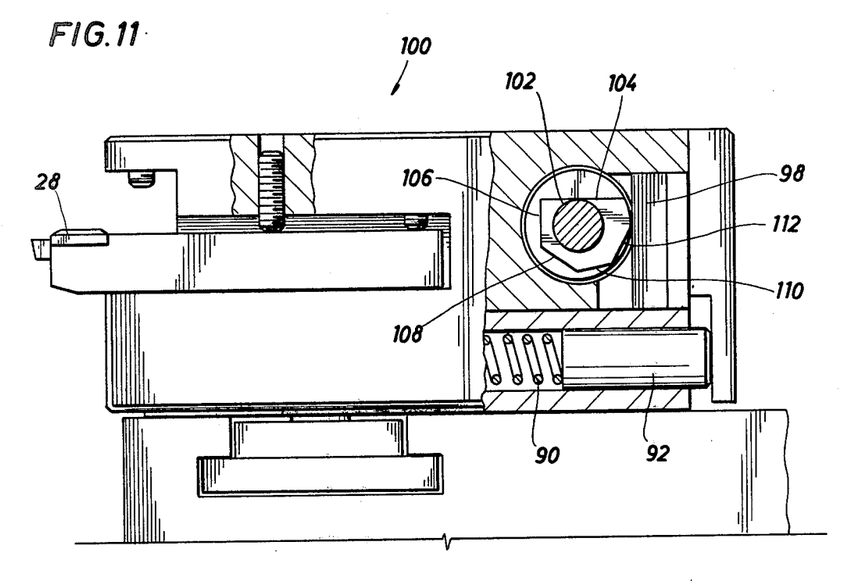
FIG. 11 discloses an alternate embodiment which advances the tool point by a different distance dependent on engagement with five cam lobes as shown in FIG. 11.
Figure 12:
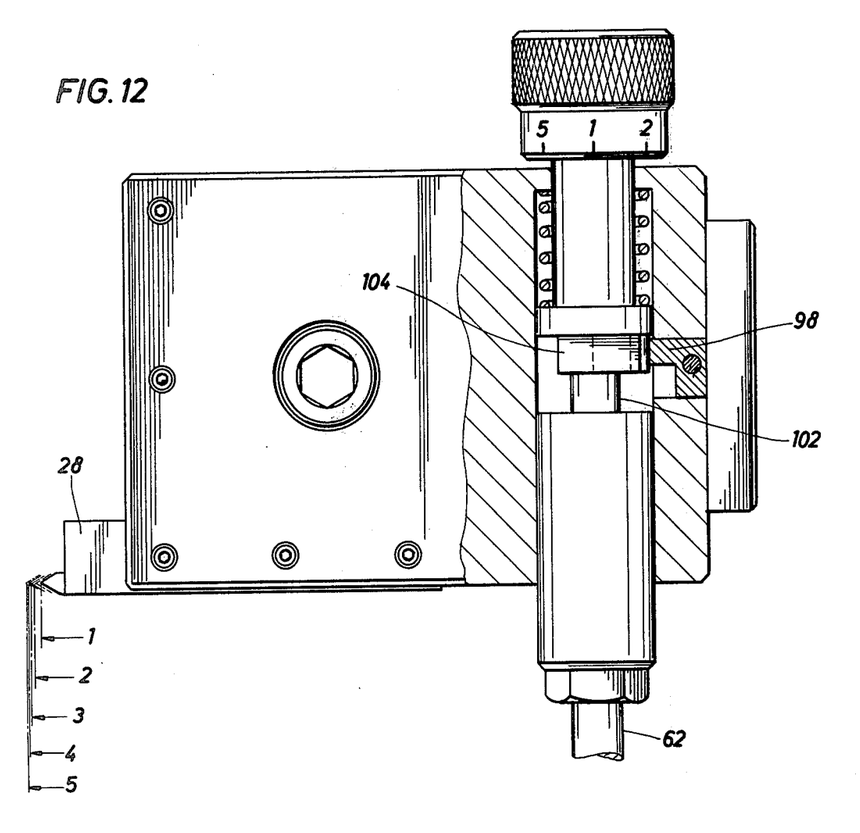
FIG. 12 is a top view of the embodiment shown in FIG. 11 including means for setting the tool to the five cam levels shown in FIG. 11.

It is believed that the foregoing sequence of operation directed to FIGS. 7 through 10 fairly well describes how the device operates. Attention is next directed to an additional embodiment of the apparatus. In FIGS. 11 and 12 considered jointly, an embodiment identified by the numeral 100 is illustrated. It is similar in all regards to the embodiments 10 and 60 with the following noted exceptions. The slide bolt functions in the same fashion and incorporates a narrow neck 102. The neck 102 is immediately adjacent to five cams. The number can be varied from five, but five are shown in the drawings. The several cams are flat faces cut at differing radii relative to the narrow neck 102. As an easy example, the numeral 104 identifies a flat face which has a radius equal to the radius of the narrow neck. The numeral 106 identifies a second face which has a larger radius. The two steps 104 and 106 thus differ in location by radial distance. The numeral 108 identifies a third cam face. It is at a greater radial distance from the axis of the slide bolt. The numerals 110 and 112 describe radial faces which are even further remote from the axis of the sliding bolt.

The five radial faces collectively define five ranges of movement of the top plate when it slides. As shown in FIG. 12 of the drawings, one face permits the tool point to penetrate to a nominal cutting distance or depth. This makes the first cut, and this cut depth is located by the operator relative to the work piece in light of many factors which the operator can utilize in determining the depth of the first cut. This cutting depth is the depth achieved with the cam face 106. In other words, the cam face 106 is positioned, by rotation of the slide bolt, against the cam follower, and cutting to a specified depth is thus achieved.

After the first pass is made and the first cut has been completed, the traveling carriage is repositioned to initiate the second cut. The traveling carriage is engaged with the lead screw, and the second cut begins. The second cut occurs with the cam follower resting against the face 108. When it reaches the neck, retraction is again achieved. A third pass is made after repositioning the carriage. The third pass is achieved, and a controlled depth of cut is accomplished by initially positioning the slide bolt so that the face 110 is positioned against the cam follower. Additional passes utilize each face in sequence. Thus, each cut will track the thread under control of the lead screw. Each cut will be like the cut before it, except that it will be slightly deeper, the depth being permitted by the cam follower 98 resting against differing faces. It will be observed that the tool point is retracted to the same relative location. This retraction always occurs when the cam follower rests against the neck 102. Such retraction permits the operator then to move the carriage quickly toward the tail stock, preparing the apparatus for the next pass over the threads.

FIG. 12 discloses that the depth of penetration of the tool point is different between the first two passes and the last two passes, as an example. The first pass over the work piece cuts substantial metal. The last pass is more of a finishing pass whereby the thread surfaces are smoothed. It will be observed in FIG. 12 that the depth of penetration decreases with each step.

The present invention is an accessory which can be removed from an engine lathe. It is bolt attached through use of the bolt 88. In the embodiments 60 and 100, there is no other mechanism attached to the lathe. By contrast, the embodiment 10 utilizes linkages which extend the length of the lathe and which have adjustable collars. At the time of setup, these adjustable collars have to be located so that the device is adjusted to cut the threads at a required location on the work piece. Setup is relatively easy to accomplish because the primary setup function is merely shifting of the collars on the linkages.

For the embodiment 10, the probe 62 must be adjusted relative to the head stock as a setup step.

The present invention can be used in repetitive fashion. A first blank work piece is inserted, and a thread is cut on it. A second blank work piece is inserted in the same fashion to the same depth in the chuck or collet. This is fairly easily accomplished presuming the work piece blanks are identical to one another. This is customarily the situation.

The foregoing is directed to the various embodiments of the present invention, but the scope thereof is determined by the claims which follow.

I claim:

1. An attachment for a standard engine lathe which lathe has
   (a) a head stock for rotating a workpiece
   (b) above a set of parallel ways
   (c) which support a traveling carriage for movement along the ways, (d) a lead screw parallel to the ways
(e) for driving a traveling nut connected to the traveling carriage to move the traveling carriage along the ways,
(f) a cross feed on the traveling carriage, the attachment comprising:
  (1) an attachment housing demountably positioned above the traveling carriage for movement along the cross feed toward and away from the locus of a workpiece supported by the head stock;
  (2) said attachment housing comprising:
    (i) a lower plate;
    (ii) an upper plate;
    (iii) abutting faces on said plates contacting one another to enable sliding movement;
    (iv) means for relatively fixing said lower plate to the traveling carriage;
    (v) a slidable dovetail between said plates enabling movement in a direction and further constraining movement in a direction perpendicular to the direction in which movement is permitted;
  (3) tool point securing means carried by said upper plate for securing a tool point to cut a workpiece;
  (4) a resilient means coacting between said upper plate and lower plate for urging said upper plate in movement along said slidable dovetail;
  (5) wherein said dovetail is oriented on the traveling carriage to retract a tool point carried by said tool point securing means away from a workpiece;
  (6) said resilient means imparting movement to said upper plate of at least a specified distance sufficient to retract the tool point from the workpiece;
  (7) a shaft supported in a chamber formed in said upper plate, said shaft movable along its length between first and second positions;
  (8) a cam operatively supported by said shaft which cam has first and second relative locations which differ from one another;
  (9) cam follower means cooperatively engaged with said cam which cam follower means moves from said first to said second locations;
  (10) means for rotating said shaft to rotate said cam supported thereby between altered relative positions to said cam follower means;
  (11) said shaft and cam incorporating a shaped portion enabling movement of said cam follower means in setting and resetting said cam follower means relative to said shaft to enable movement of said cam follower means for movement between the first and second locations;
  (12) each of said cam follower means and cam being fixed in position to one of said upper and lower plates, said resilient means urging said upper plate along said slidable dovetail such that said tool point securing means moves a tool point secured thereby into a cutting and a retracted position relative to a workpiece;
  (13) movable means for sensing the position of said housing relative to a designated location on the workpiece which location determines termination of a multipass cut thread on the workpiece; and
  (14) connective means connecting movement of said movable means to said shaft for moving said shaft to move said cam relative to said cam follower means which enables said upper and lower plates to move relatively along said slidable dovetail at urging of said resilient means and wherein said resilient means is released for operation only after operation of said sensing means.

2. The apparatus of claim 1 wherein the attachment is repositioned on cross feeding movement of the traveling carriage to operate at least twice to retract a tool point working against a workpiece and wherein said shaft is parallel to the ways of the lathe.

3. The apparatus of claim 2 wherein said shaft is rotatable and includes a neck having a circular cross section and wherein said cam includes a protruding lobe having a low portion adjacent to and equal in height to said neck and also having an elevated portion.

4. The apparatus of claim 3 wherein said cam follower means selectively contacts said neck and said cam lobe and is shifted between said first and second locations on axial movement of said shaft in response to urging of said sensing means.

5. The apparatus of claim 1 wherein said shaft includes an end located probe attached thereto and which at least partially comprises said sensing means and which extends toward the head stock of the lathe.

6. The apparatus of claim 1 including an elongate linkage means extending to a fixed reference structure supported on the lathe wherein said linkage means senses relative movement of the traveling carriage on movement along the lead screw.

7. The apparatus of claim 1, wherein said cam has two or more steps thereon and said cam follower means engages said steps on rotation of said shafts to incrementally reposition a tool point carried by said tool point securing means.

8. The apparatus of claim 7 wherein
  (a) the attachment is repositioned on cross feeding movement of the traveling carriage to operate at least twice to retract a tool point working against a workpiece and wherein said shaft is parallel to the ways of the lathe;
  (b) said shaft is rotatable and includes a neck having a circular cross section and wherein said cam includes a protruding lobe having a low portion adjacent to and equal in height to said neck and also having an elevated portion; and
  (c) said cam follower means selectively contacts said neck and said cam lobe and is shifted between said first and second locations on axial movement of said shaft in response to urging of said sensing means.

9. The apparatus of claim 8 wherein said shaft includes an end located probe attached thereto and which at least partially comprises said sensing means and which extends toward the head stock of the lathe.

10. The apparatus of claim 8 including an elongate linkage means extending to a fixed reference structure supported on the lathe wherein said linkage means senses relative movement of the traveling carriage on movement along the lead screw.

* * * * *